W. A., F. AND F. H. ENGELHARD.
FLOAT.
APPLICATION FILED OCT. 29, 1919.
1,347,217.
Patented July 20, 1920.
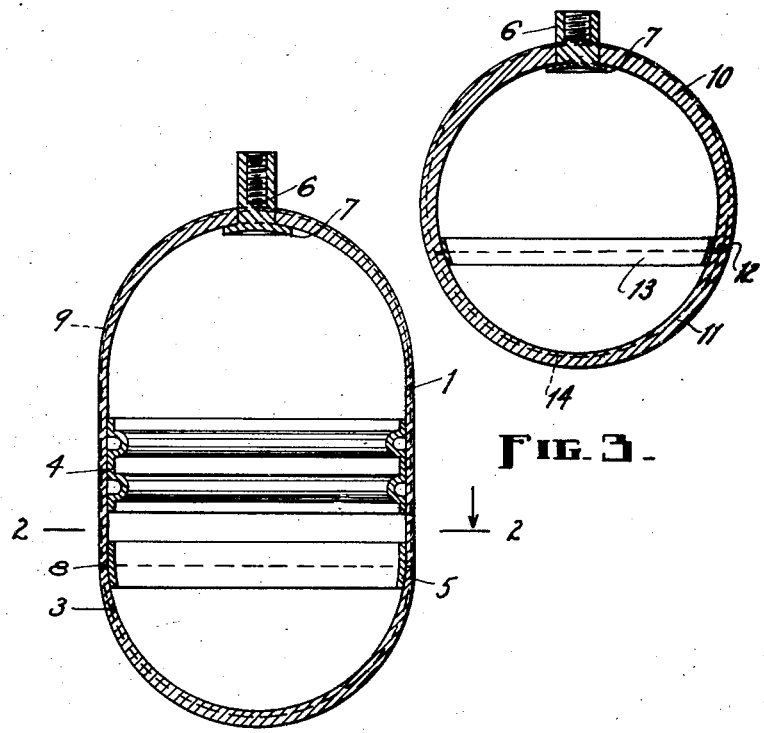
FIG. 1.
FIG. 3.
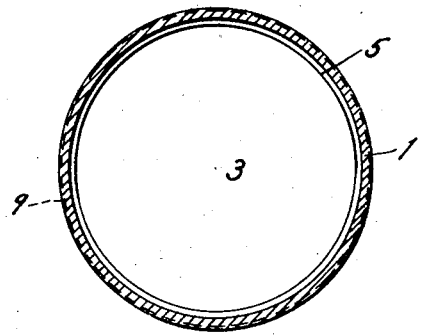
FIG. 2.
WITNESS:
INVENTOR.
William A. Engelhard,
Frank Engelhard,
BY Frederick H. Engelhard,
Frank A. Cutter,
ATTORNEY.

UNITED STATES PATENT OFFICE.

WILLIAM A. ENGELHARD, FRANK ENGELHARD, AND FREDERICK H. ENGELHARD, OF SPRINGFIELD, MASSACHUSETTS.

FLOAT.

1,347,317.   Specification of Letters Patent.   Patented July 20, 1920.

Application filed October 29, 1919. Serial No. 334,241.

*To all whom it may concern:*

Be it known that we, WILLIAM A. ENGELHARD, FRANK ENGELHARD, and FREDERICK H. ENGELHARD, all citizens of the United States of America, and residents of Springfield, in the county of Hampden and State of Massachusetts, have invented a new and useful Float, of which the following is a specification.

Our invention relates to improvements in floats of both the column and spherical types, which are used in fluid containers of various kinds and for various purposes, and consists essentially of what may be termed a long upper shell and a short lower shell, which shells are interiorly reinforced with suitable means and in a suitable manner, and exteriorly plated in a certain peculiar manner, all as hereinafter set forth.

Heretofore floats have been made with a joint located in the horizontal, central plane thereof, and such joint so located is very liable to become broken or ruptured and the float to buckle or collapse, even under pressure to withstand which the float is particularly adapted and especially designed. It is a well known fact that a float subjected to alternating high and low temperature expands and contracts and produces an action technically known as "breathing." This breathing action is more pronounced and has its greatest effect in the central portion, transversely, of the float, and it is practically impossible in many if not most cases so to construct a float with a central, transverse joint which is able to withstand the aforesaid action, and which will not, sooner or later, open at the joint, when, of course, the float is rendered useless. The primary object of our invention is, therefore, to produce a float, of either of the types above mentioned, which has its joint remote from and preferably below the transverse center thereof, and is so constructed, reinforced, and strengthened that it is able to resist and withstand without impairment, not only exterior pressure to the required or predetermined extent or degree, but also the action due to change in temperature, that is to say, the so-called breathing action.

A further object is to construct a float the top and bottom portions of which are capable to the fullest extent of withstanding the force or pressure exerted thereon, as well as to construct the float so that it will resist pressure on the sides thereof. Naturally and for obvious reasons the bottom of the float is in practice subjected to great pressure, while the top of the float must be made sufficiently strong to enable suitable attachment to be made at that point. We provide our float at the top and bottom with special and peculiar means, so to speak, for affording the necessary degree of strength and resistance, and strength and resistance which are of the particular character needed at those points or localities.

Still another object is to produce a float of this character which not only possesses the advantages set out above, but is comparatively simple and inexpensive in construction, and withal entirely practicable and highly efficient.

Other objects and advantages will appear in the course of the following description.

We attain the objects and secure the advantages of our invention by the means illustrated in the accompanying drawings, in which—

Figure 1 is a central, vertical section through a column float which embodies a practical form of our invention; Fig. 2, a cross section taken through said float on lines 2—2, looking down, in Fig. 1, and, Fig. 3, central, vertical section through a spherical float that also embodies a practical form of said invention.

Similar reference numerals designate similar parts throughout the several views.

Upon referring to the first two views, it will be observed that the column float therein illustrated comprises upper and under shells 1 and 3, respectively, an intermediate, interior, reinforcing ring 4, and an interior, joint-closing, and reinforcing ring 5. There is also, at the top of the shell 1 and, therefore, of the float a nipple 6, such as is common to floats of this type, and to spherical floats as well—see Fig. 3. The nipple 6, in each case, has a flange 7 at its inner end which flange is received against the top of the float inside.

Referring to the column float again, it will be seen that the shell 1 has a hemispherical top and extends downwardly therefrom to form the cylindrical side of the float. This shell is spun from a sheet of metal and formed into shape, during the process of which the metal becomes thinner toward the open, lower end of the shell, with the result that the thickest part of said shell is at the top, and it is through such top that the nipple 6 of this float extends and to the same that the said nipple is affixed. The nipple 6 is securely fastened or attached to the top of the shell 1 in the usual manner.

The shell 3 is also spun out of sheet-metal, and it is of substantially the same thickness as the contiguous edge portion of the shell 1. The joint between the shells 1 and 3 is indicated by the numeral 8, and the same is a butt or flush joint.

The metal of which the shells 1 and 3 are made is copper in practically all cases, that being the metal of which floats generally are almost universally constructed, such shells being spun out of or formed from comparatively thin sheets of copper.

The ring 4 is preferably convoluted in cross section, substantially in the manner shown, and said ring is located in the transverse center of the float, being in direct contact with the cylindrical portion of the shell, and being held thereto usually by the application of solder. There is no joint adjacent or contiguous to the ring 4, which fact together with the presence of said ring, both removes all danger of rupture of the shell 1 and insures the float against collapse, in the vicinity of said ring which is one of the more vulnerable zones of the float.

The ring 5 is first forced down into the top of the shell 3, wherein the under portion of said ring is adapted to fit, leaving the upper portion of said ring extending above said shell. The shell 1 is then placed over the ring 5 on the shell 3 to form the joint 8. The joint 8 is soldered, and more or less of the solder used for that purpose works through onto the ring 5, so that in no event is there any liability of displacement on the part of said ring. The ring 5 overlaps the jointed portions of the two shells, thus assisting in closing the joint 8, and buttresses such portions. Furthermore, this ring like the ring 4 greatly augments the power of resistance to pressure of the float.

After the parts have been assembled, in the manner hereinbefore described, an exterior coating of metal is deposited, by electro-plating, on the shells 1 and 3. Copper is the metal used for this coating when the shells 1 and 3 are of copper, which is almost invariably the case as previously observed. For the sake of illustration, we have shown a dotted line 9 in the drawings to indicate an imaginary line between the shells 1 and 3 and the coating, to which reference has just been made, deposited on said shells. The material inside of the dotted line 9 is assumed to be the original metal of the copper shells 1 and 3, and the material outside of such line is assumed to be the deposit or coating. This deposit or coating covers the joint 8 completely, as it does every other part of the exterior of the float, except the nipple 6.

In the process of electro-plating the heavier or heaviest deposit is always at the bottom, and so, as is clearly shown in Fig. 1, the thickest portion of the plate or coating in the present case is at the bottom of the shell 3 and consequently of the float itself. Thus the bottom of the float is materially strengthened, and so strengthened at another of its more vulnerable zones.

The spherical float illustrated in Fig. 3 consists of upper and under shells 10 and 11, respectively, joined together with a flush joint below the central, horizontal plane of the float, at 12, and an interior, reinforcing, joint-closing ring 13, with the exterior coating or plating outside of the dotted line 14, which like the dotted line 9 in the first example indicates an assumed line of demarcation between the metal of the shells and the metal of the deposit. Here, again, the upper shell is thicker at the top than at the sides, to afford the extra strength required for the nipple 6 of this float, which nipple is attached to said shell in the same manner as before, and the plating or coating is thicker at the bottom of the under shell, due to a similar cause and for a similar reason. The shell 10 is greater in size than a hemisphere, while the shell 11 is less in size than a hemisphere, and said shell 11 corresponds in thickness with that of said shell 10 at the thinnest part, namely, at the lower end.

No reinforcing ring, as 4, is generally needed in the transverse center of the spherical float, since the shape of said float, when the same is constructed in the manner herein shown and described, affords the necessary strength and power of resistance for the central, transverse zone thereof.

Aside from the shape and consequent slight structural changes hereinbefore explained, the spherical float is similar to the column float in construction and manner of assembling, and the former possesses advantages which are very similar to if not identical with those possessed by the latter.

In each example the exterior surface is without a joint and smooth and unbroken, as is essential in a device of this kind.

The size of the floats will vary, and more or less change in the size, shape, construction, and arrangement of either or both of the rings in the column float and of the ring in the spherical float may be made without departing from the spirit of our invention or exceeding the scope of what is claimed.

What we claim as our invention, and desire to secure by Letters Patent, is—

1. As an improved article of manufacture, a float comprising two shells joined together on a plane which is remote from the central horizontal plane of the float, and a coating of metal on the exterior of said shells and over the joint therebetween, the upper shell being thicker on the top than the lower shell.

2. As an improved article of manufacture, a float comprising two shells joined together on a plane which is remote from the central horizontal plane of the float, and a coating of metal on the exterior of said shells and over the joint therebetween, such coating being thickest at the bottom of said float.

3. As an improved article of manufacture, a float comprising two shells joined together on a plane which is remote from the central horizontal plane of the float, and a coating of metal on the exterior of said shells and over the joint therebetween, the upper shell being thicker on top than the under shell, and said coating being thickest at the bottom of said float.

4. As an improved article of manufacture, a float comprising two shells joined together on a plane which is remote from the central horizontal plane of the float, a reinforcing and joint-closing ring within said shells, and a coating of metal on the outside of said shells and over the joint therebetween.

5. A float comprising upper and under shells joined together at their ends on a plane which is below the central horizontal plane of the float, said upper shell being thicker on top than said under shell, and a coating on the exterior of said shells and over the joint therebetween.

6. A float comprising upper and under shells joined together at their open ends on a plane which is below the horizontal central plane of the float, and a coating of metal on the exterior of said shells and over the joint therebetween, said coating being thickest at the bottom of the float.

7. A float comprising upper and under shells joined together at their open ends on a plane which is below the central horizontal plane of the float, said upper shell being thicker on top than said under shell, and a coating of metal on the exterior of said shells and over the joint therebetween, said coating being thickest at the bottom of the float.

8. A float comprising upper and under shells joined together at their open ends on a plane which is below the central horizontal plane of the float, a reinforcing and joint-closing ring within said shells, and a coating of metal on the exterior of said shells and over the joint therebetween.

9. A float comprising a shell having hemispherical and cylindrical portions, a reinforcing ring within said cylindrical portion of said shell, a hemispherical shell joined to said cylindrical portion, a reinforcing and joint-closing ring within said shells, and a coating of metal on the exterior of said shells and over the joint therebetween.

10. A float comprising upper and under shells joined together at their open ends on a plane which is below the horizontal central plane of the float, said upper shell being thicker on top than said under shell, a reinforcing and joint-closing ring within said shells, and a coating of metal on the exterior of said shells and over the joint therebetween, such coating being thickest at the bottom of the float.

11. A float comprising a shell having hemispherical and cylindrical portions, such hemispherical portion being thicker than such cylindrical portion, a reinforcing ring within said cylindrical portion, a hemispherical shell joined to said cylindrical portion, a reinforcing and joint-closing ring within said shells, and a coating of metal on the exterior of said shells and over the joint therebetween, such coating being thickest at the bottom of the float.

WILLIAM A. ENGLEHARD.
FRANK ENGLEHARD.
FREDERICK H. ENGLEHARD.

Witnesses:
A. C. FAIRBANKS,
HAZEL E. LOMBRA.